United States Patent [19]

Rosén

[11] Patent Number: 4,948,665

[45] Date of Patent: Aug. 14, 1990

[54] MODIFIED THERMOPLASTIC AND A METHOD FOR THE MANUFACTURE OF THE THERMOPLASTIC

[75] Inventor: Klas A. Rosén, Helsingborg, Sweden

[73] Assignee: Tetra Pak Holdings & Finance S.A., Pully, Switzerland

[21] Appl. No.: 355,464

[22] Filed: May 22, 1989

Related U.S. Application Data

[62] Division of Ser. No. 191,118, May 6, 1988.

[30] Foreign Application Priority Data

May 11, 1987 [SE] Sweden ................... 8701924

[51] Int. Cl.$^5$ ................... B65D 47/36; C08J 3/20; C08K 3/00; B29C 45/00
[52] U.S. Cl. ................... 428/332; 220/339; 220/DIG. 14; 220/DIG. 16; 264/328.18; 523/216; 523/220; 524/427; 524/449; 524/451; 524/494; 524/496; 524/585
[58] Field of Search ....... 428/332; 220/339, DIG. 14, 220/DIG. 16; 524/496, 427, 449, 451, 585, 494; 523/220, 216; 264/328.18

[56] References Cited

U.S. PATENT DOCUMENTS

| | | | |
|---|---|---|---|
| 3,342,901 | 9/1967 | Kosinsky et al. | 264/328.18 |
| 4,120,844 | 10/1978 | Meyer et al. | |
| 4,255,367 | 3/1981 | Wallace et al. | 264/328.18 |
| 4,473,167 | 9/1984 | Bailey | 220/90.4 |
| 4,480,065 | 10/1984 | Kawai et al. | 524/456 |
| 4,552,689 | 11/1985 | Yui et al. | 524/496 |
| 4,570,818 | 2/1986 | Borst et al. | 220/339 |
| 4,687,129 | 8/1987 | Cugley | 220/339 |
| 4,705,818 | 11/1987 | Kawai et al. | 524/494 |
| 4,708,623 | 11/1987 | Aoki et al. | 264/328.18 |
| 4,724,977 | 2/1988 | Cleevely et al. | 220/339 |
| 4,724,978 | 2/1988 | Cleevely et al. | 220/339 |
| 4,734,450 | 3/1988 | Kawai et al. | 523/220 |
| 4,739,900 | 4/1988 | Borst | 220/339 |
| 4,761,451 | 8/1988 | Moteki et al. | 524/496 |
| 4,812,247 | 3/1989 | Fahner et al. | 264/328.18 |
| 4,865,216 | 9/1989 | Landis | 220/270 |
| 4,883,193 | 11/1989 | Christensson | 220/339 |

FOREIGN PATENT DOCUMENTS

| | | | |
|---|---|---|---|
| 0016389 | 10/1980 | European Pat. Off. | |
| 3519053 | 12/1986 | Fed. Rep. of Germany | |
| 0154139 | 12/1980 | Japan | 264/328.18 |
| 499333 | 1/1939 | United Kingdom | 264/328.18 |
| 1447304 | 8/1976 | United Kingdom | |
| 2033821 | 5/1980 | United Kingdom | 264/328.18 |

OTHER PUBLICATIONS

Chemical Abstract, vol. 100, Abstract No. 8095p, (1984).

Primary Examiner—Herbert J. Lilling
Attorney, Agent, or Firm—Burns, Doane, Swecker & Mathis

[57] ABSTRACT

The prerequisites for the injection moulding from thermoplastic material of container lids with a tear-up opening arrangement which is to function well on opening as well as on reclosing are improved through the use of a modified thermoplastic containing inert filler in a quantity of 10–15% of the weight of the mixture. Such a modified thermoplastic is manufactured by heating a thermoplastic, known in itself, e.g. polyethylene, to melting temperature with simultaneous admixture of the filler. The mixture is mechanically processed for a good distribution of the filler in the melted plastic mass which thereafter is cooled to form the modified thermoplastics.

12 Claims, No Drawings

MODIFIED THERMOPLASTIC AND A METHOD FOR THE MANUFACTURE OF THE THERMOPLASTIC

This application is a divisional, of application Ser. No. 191,118, filed May 6, 1988.

FIELD OF THE INVENTION

The present invention relates to a modified thermoplastic material intended and adapted first and foremost for the injection moulding of container lids comprising an opening arrangement of the tear-up type. The invention, moreover, relates to a method for the manufacture of the modified thermoplastic, and to container lids of the type described manufactured by injection moulding.

BACKGROUND OF THE INVENTION

It is known that container lids of thermoplastic provided with tear-up opening arrangement can be manufactured by injection moulding. The known container lids usually have a tearing indication or material weakening, the tearing up of which means that the portion of the lid located within the weakened area can be removed by folding up so as to expose an emptying opening when the contents within a container are to be made accessible. The known container lids usually are also provided with some type of pull-tab or pull-ring by means of which the tearing up of the tearing indication can be facilitated.

The requirement made on such container lids is, of course, that they should be inexpensive and easy to manufacture, but above all the opening arrangement should function well. This implies among other things that it should be easy to tear up the tearing indication without having to apply excessive foce, but that it should not be liable to open spontaneously during normal transport and handling of the container. These two requirements, as will be readily understood, are contradictory, since great security against spontaneous tearing up means that the tearing indication must not be made too weak, which in turn means that a greater force is required for tearing up the indication when the container is to be opened. In certain cases, depending on the contents of the container, it is also desirable, or even necessary, that it should be possible to reclose the opened container between each emptying operation and, from a point of view of convenience, the reclosure should be possible, preferably, by folding back the folded-up portion of the lid so that it will snap closed in its original position through engagement with the residual tearing edge in the opening contour. For such reclosing by snap engagement to function well the tearing edges of the torn-up tear indication ought to be straight and preferably completely unfrayed.

With conventional thermoplastics, such as e.g. polyethylene, which have been used hitherto as a starting material for injection moulding of the known container lids, it has proved difficult to obtain a well-functioning opening arrangement which is readily openable and which makes possible the desired snap closing on reclosure of the container. This difficulty is due to a large extent to the fact that thermoplastics are a very tough (elastic) material which offers great resistance to tearing on the tear indications, even in the case of small material thicknesses, and in order to make it possible for the tear indication to tear without excessive force having to be applied, the conventional thermoplastics consequently require that the injection moulding must be carried out under very strictly controlled conditions, so that an optimum material thickness within frequently very narrow tolerances is achieved with regard to the tearing indication. Such strict conditions, required during the injection moulding, are difficult to reconcile, however with commercial production on a large scale, and for economic reasons, therefore, it has been more or less inevitable to waive the requirement regarding optimum material thickness of the tear indication.

DETAILED DESCRIPTION OF A PREFERRED EMBODIMENT

In accordance with the present invention is has been found, however, that a thermoplastic of a type known in itself, e.g. polyethylene, can be modified through the admixture of inert, finely divided filler to make it more suitable for the purpose of manufacturing injection moulded container lids with a tear-up opening arrangement which is both readily openable and functions well on reclosure, and more particularly it has been found that the tear resistance of conventional thermoplastics can be substantially reduced to almost paperlike character, whilst other mechanical properties, e.g. tensile strength, are substantially unaffected if the quantity of admixed filler is controlled so as to amount to between 10 and 15% calculated on the total weight of the mixture.

With quantities over 15 percent by weight the thermoplastic does become brittle and readily tearable but loses the required tensile strength, whereas a thermoplastic with quantities under 10 percent by weight is still too tough and difficult to tear in order to the desired smooth and unfrayed tearing edge on tearing. In accordance with the invention, therefore, the quantity of filler added must be 10–15 percent by weight of the total weight.

The filler which should be used in accordance with the invention for the manufacture of the modified thermoplastic can be finely divided inorganic material of a type known in itself, such as talc, chalk, gypsum, clay etc. either separately or in optional mutual combinations with one another. In order to function optimally the filler preferably should be fine-grained and have an average grain size of 10 $\mu$m. Among the fillers named here fine-grained chalk is preferred at present, since it is easily available, inexpensive and practically free from impurities which impart an unpleasant taste to sensitive container contents such as milk. Fillers in a form other than purely fine-grained ones may be used, such as needlelike or flaky fillers.

The invention also relates to a method for modifying a thermoplastic so that it is better suitable than conventional thermoplastics for the injection moulding of container lids provided with a tear-up opening arrangement which should be readily openable in a convenient manner and also permit a well-functioning reclosure through snap engagement between torn up edges of the opening arrangement, as has been described above. The method in accordance with the invention is characterized in that a thermoplastic of a type known in itself during mechanical processing is heated to melting temperature, that an inert filler is furnished to the thermoplastic before, during or after this melting depending on the actual form of the filler, that the filler added is dispersed and divided in the thermoplastics through continued mechanical processing, and that the mixture of thermoplastic and well-divided filler dispersed in the thermoplastic, possibly after a preceding moulding operation, is cooled to form the modified thermoplastic, the quantity of filler which is added to the thermoplastic being controlled so that it amounts to not more than 10-15% of the weight of the mixture.

The filler to be admixed to the thermoplastic, as mentioned above, preferably should be granular, but other conceivable forms are also usable. If the filler is present in the form of needlelike or flaky particles it is appropriate in accordance with the invention for the filler to be added only after the thermoplastic has melted so as to avoid any breaking up of the hard thermoplastic through the effect of the mechanical processing before the melting. Optimum properties of the modified thermoplastic in accordance with the invention are achieved, however, if the filler is furnished in the form of granular particles of an average grain size of approx. 10 μm, and since such particles are lsss susceptible to crushing through mechanical effects, the particles may be added advantageously already before the melting of the thermoplastic. This brings with it the further advantage that the mechanical processing can go on for a sufficient time to ensure that a homogeneous dispersion of the filler in the thermoplastic is achieved.

To facilitate the mixing in of the filler material added it can be appropriate in accordance with the invention to add a dispersing agent capable of wetting the filler, and as an example of such a dispersing agent, which has been found to work well in accordance with the invention, may be mentioned polyethylene wax, stearates and stearin, but other dispersing agents with this capacity, known to those versed in the art, may also be used. The quantity of dispersing agent which should be added in accordance with the invention generally is kept between 0.5 and 2% of the total weight of the mixture and this has been found adequate for obtaining the dispersion effect aimed at.

The method in accordance with the invention may be carried out, for example, with the help of a conventional extruder of the screw-type, the thermoplastics being supplied in the form of granules or powder through the feed hopper at the feed end of the machine and, with successive heating to melting temperature (e.g. 200° C.) being moved, whilst it is mixed, by the rotating screw towards, and out through, a suitable orifice at the discharge end of the machine in the form of, for example, a strand which is cooled and subsequently finely chopped to a suitable form for the purpose of injection moulding. The inert filler is furnished either before, during or after the melting of the thermoplastics in the machine depending on the actual form of the filler. If the filler is present in the form of granular particles the filler may be added already at the feed end of the machine, whereas filler in the form of needlelike or flaky particles is added appropriately after melting of the thermoplastics at separate points along the rotating screw between the feed and discharge ends of the machine so as to avoid breaking up of the particles. In those cases where it is desirable also to furnish a dispersing agent or wetting agent for the filler particles, this too may be added to the machine through the feed hopper at the feed end, either separately or mixed up with the granular filler particles, but it is also possible, of course, to add the dispersing agent at optional points along the rotating screw, e.g. mixed with the needlelike or flaky filler particles. As mentioned earlier, the quantity of filler added in accordance with the invention should amount to maximum between 10 and 15% of the total weight of the mixture, and it is sufficient moreover if the quantity of dispersing agent added is kept at between 0.5 and 2% of the weight of the mixture in order to facilitate the dispersion and distribution of the filler particles in the melted thermoplastics mass.

The invention furthermore relates to an opening arrangement of the tear-up type provided with container lid which is characterized in that it is injection-moulded in one coherent piece from a modified thermoplastic material in accordance with the invention.

By comparison with container lids injection-moulded from conventional thermoplastics, e.g. LDPE (low density polyethylene), it was found that container lids injection-moulded by using a modified thermoplastics in accordance with the invention containing 10-15 percent by weight of inert filler, e.g. granular chalk of a grain size of approx. 10 μm, and between 0.5 and 2 percent by weight of dispersing agent of a type known in itself, present an opening arrangement of the tear-up type which is both easier to open, that is to say it requires less force for opening, and, moreover, gives a smoother and less frayed tearing edge which makes possible a better reclosing than the tear-up opening arrangement of the comparable container lid which has been injection moulded without filler. Moreover it has been found that it was possible for the injection moulding of the container lid in accordance with the invention to be performed with a substantially reduced (5-30%) cycle time owing to the shorter melting and cooling time of the modified thermoplastics.

What is claimed is:

1. A modified thermoplastic injection molded container lid comprising an injection molded thermoplastic lid having an opening arrangement of the tear-up type, the modified thermoplastic containing inert inorganic filler dispersed in the thermoplastic in an amount of 10-15% of the weight of the mixture.

2. A modified thermoplastic lid in accordance with claim 1, wherein the filler consists of particles of an average grain size of substantially 10 μm.

3. A modified thermoplastic lid in accordance with claim 1, wherein the filler is a member selected from the group consisting of mica, talc, chalk, gypsum, wollastonite and clay and combinations thereof.

4. A modified thermoplastic lid in accordance with claim 1, further comprising a wetting agent for the filler.

5. A modified thermoplastic lid in accordance with claim 4, wherein the wetting agent constitutes between 0.5 and 2% of the weight of the material.

6. A modified thermoplastic lid in accordance with claim 1, wherein the thermoplastic is constituted of polyolefin material.

7. A modified thermoplastic lid in accordance with claim 6, wherein the polyolefin material is a member selected from the group consisting of polyethylene and polypropylene.

8. A modified thermoplastic lid in accordance with claim 1, wherein said thermoplastic is polyethylene.

9. A method for preparation of a modified thermoplastic injection moulded thermoplastic container lid provided with tear-up, reclosable opening arrangements, the method comprising the steps of:
heating the thermoplastic to its melting temperature;
adding an inorganic filler to the thermoplastic;
mechanically processing the thermoplastic and filler to distribute the filler in the thermoplastic; and cooling the mixture of thermoplastic and filler to form the modified thermoplastic, the amount of filler added to the thermoplastic being controlled so that the mixture includes filler in an amount of 10–15% of the weight of the mixture.

10. A method in accordance with claim 9, further comprising the step of wetting the filler through the addition of a dispersing agent, the dispersing agent being added either separately or together with the filler.

11. A method in accordance with claim 10, wherein the quantity of dispersing agent added to the filler amounts of 0.5–2% of the weight of the material.

12. The method in accordance with claim 10, further comprising the step of heating the filler prior to addition of the filler to the thermoplastic.

* * * * *